(12) United States Patent
Jungmann et al.

(10) Patent No.: US 8,636,902 B2
(45) Date of Patent: Jan. 28, 2014

(54) OIL FILTER ARRANGEMENT

(76) Inventors: Peter Jungmann, Bisingen (DE);
Benjamin Diehl, Bodelshausen (DE);
Stefan Heinz, Bodelhausen (DE)

(*) Notice: Subject to any disclaimer, the term of this patent is extended or adjusted under 35 U.S.C. 154(b) by 661 days.

(21) Appl. No.: 12/839,059

(22) Filed: Jul. 19, 2010

(65) Prior Publication Data
US 2010/0282658 A1 Nov. 11, 2010

Related U.S. Application Data

(63) Continuation of application No. PCT/EP2008/009081, filed on Oct. 28, 2008.

(51) Int. Cl.
*B01D 35/16* (2006.01)
*B01D 35/153* (2006.01)

(52) U.S. Cl.
USPC .................. 210/232; 210/248; 210/443

(58) Field of Classification Search
USPC .......................... 210/232, 248, 443
See application file for complete search history.

(56) References Cited

U.S. PATENT DOCUMENTS

| | | | | |
|---|---|---|---|---|
| 4,906,365 | A | * | 3/1990 | Baumann et al. ............ 210/238 |
| 6,746,604 | B2 | * | 6/2004 | Jainek ........................ 210/248 |
| 7,842,183 | B2 | * | 11/2010 | Heinz et al. .................. 210/235 |

FOREIGN PATENT DOCUMENTS

| | | | |
|---|---|---|---|
| DE | 33 44 568 | | 6/1985 |
| DE | 34 22 482 | | 12/1985 |
| DE | 87 14 656 | | 12/1987 |
| DE | 40 22 723 | | 4/1991 |
| DE | 44 08 888 | | 9/1994 |
| DE | 197 02 612 | | 7/1998 |
| DE | 102 13 939 | | 10/2003 |
| DE | 10 2005 041 041 | | 3/2007 |
| GB | 2162079 | A * | 1/1986 |
| WO | WO 2007/022809 | A1 * | 3/2007 |

OTHER PUBLICATIONS

PCT/EP2008/009081 International Search Report, Apr. 28, 2009.

* cited by examiner

*Primary Examiner* — Thomas M Lithgow
(74) *Attorney, Agent, or Firm* — Brinks Gilson & Lione

(57) ABSTRACT

The invention relates to an oil filter arrangement having a housing comprising a receiving space for a filter element, wherein a discharge opening is provided at the bottom of the receiving space and a discharge valve is provided in the discharge opening wherein the discharge valve comprises a valve body, which is movable between a closing position and an opening position in a displaceable manner and is moved to the locking position by a first spring element when the filter element is inserted, wherein the first spring element is disposed on the valve body on the side of the valve body facing away from the discharge opening and is configured as a compound spring having a flat, bent metal band. The metal band acts against the filter element or against an end disk of the filter element when the filter element is inserted.

10 Claims, 3 Drawing Sheets

OIL FILTER ARRANGEMENT

CROSS-REFERENCE TO RELATED APPLICATIONS

This application is a continuation of International Application No. PCT/EP2008/009081 filed on Oct. 28, 2008, which claims the benefit of DE 10 2008 006 925.6, filed Jan. 24, 2008. The disclosures of the above applications are incorporated herein by reference.

FIELD

The present disclosure relates to an oil filter arrangement.

BACKGROUND

The statements in this section merely provide background information related to the present disclosure and may not constitute prior art.

Exemplary oil filter arrangements are revealed, for example, in DE 10 2005 041 041 A1. This arrangement results in a compensation of axial tolerances of the housing and/or the filter element while still guaranteeing a secure closing of the discharge valve. The discharge valve opens automatically when the filter element is removed, which allows the oil that is currently available in the receiving space to drain through the discharge valve.

A similar oil filter arrangement is known, for example, from DE 34 22 482, DE 40 22 723 A1, DE 87 14 656 U1, DE 102 13 939 A1 and DE 197 02 612 A1.

SUMMARY

The present disclosure to provides an oil filter arrangement, which provides a secure closing of the discharge valve in a simple manner even if the housing and/or the filter elements exhibit relatively great axial tolerances.

The oil filter arrangement according to the present disclosure has the features of claim 1. In this regard, the present disclosure provides that the first spring element is positioned on the valve body on its side facing away from the discharge opening and is designed as a compound spring having a flat, arched metal band, where the metal band acts upon the filter element or upon an end disk of the filter element whenever the spring element is inserted.

The result is a reliable compensation for play in an axial direction with relatively few components while still ensuring a securely closing discharge valve. Guide and support means as used in the previously known prior art for guidance and support of coil springs therein, are no longer necessary because a compound spring is used. Furthermore, because a compound spring is used, the compound spring can act directly upon the filter element or the bottom end disk of the filter element. This also eliminates the additional force transfer means between the spring and the filter element as is provided in the previously known prior art.

An advantageous form of the present disclosure provides that the metal band in its neutral state is bent over an angular range from about 180° to about 315° and particularly over an angular range of approximately 270°. In order to achieve the most stable spring force throughout the spring deflection of the compound spring, the invention provides that the metal band—when seen in side view—will in its neutral state rest mostly upon a circular plane.

It is furthermore conceivable that at least one other metal band is used that is preferably positioned parallel to the first metal band. The spring force can thus be increased or be appropriately adjusted.

The valve body in one form is made from plastic and the compound spring is made from a metallic material. The compound spring can be cast to the plastic or cast into the plastic. It is also conceivable that according to the present disclosure, the compound spring is permanently attached to the valve body by means of fasteners such as screws or rivets.

It is also conceivable that, in order to appropriately attach the compound spring to the valve body, the compound spring has a fastening section where the metal band can be attached.

A retention stop may be installed at the housing that would limit the axial movement of the valve body in the opening direction. The retention stop can be positioned at least at one stud, said stud being provided at the bottom of the receiving space and extending axially upward. For example, when viewed from above, the retention stop can have a ring segmented or arched shape and interact with the top of the valve body in such a manner that the compound spring is not affected.

According to another arrangement of the present disclosure, it is conceivable that a discharge channel connects the discharge opening and that the second spring is designed as coil spring, wherein one end acts upon the bottom of the valve body that is facing the discharge channel and the other end acts upon at least one flange that protrudes radially to the inside in the discharge channel. The flange that protrudes radially to the inside can be designed as ring collar or as a protrusion that protrudes radially to the inside.

It is advantageous for the axial guidance of the valve body that the valve body comprises a valve rod, which protrudes into the discharge opening.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
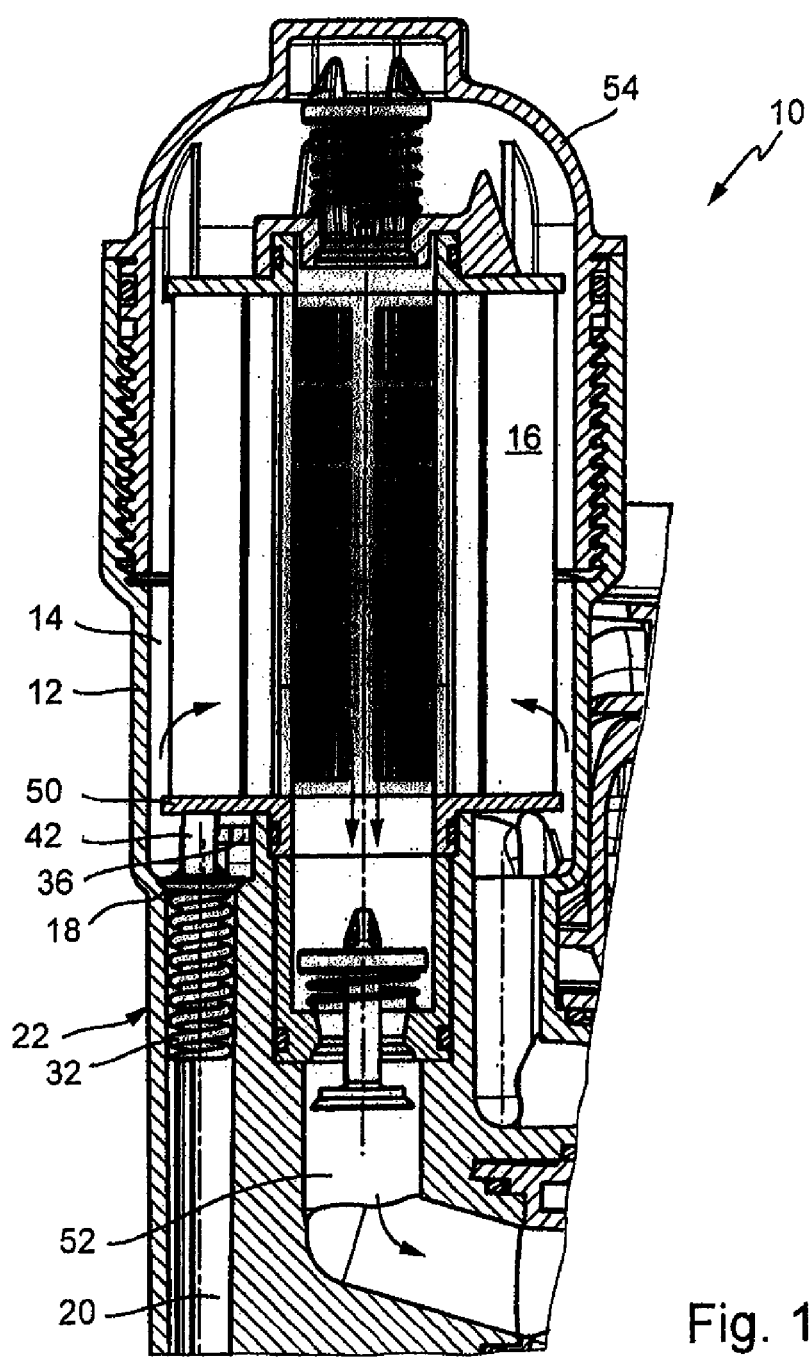
FIG. 1 shows a longitudinal section of the oil filter arrangement according to the present disclosure.
Figure 2:
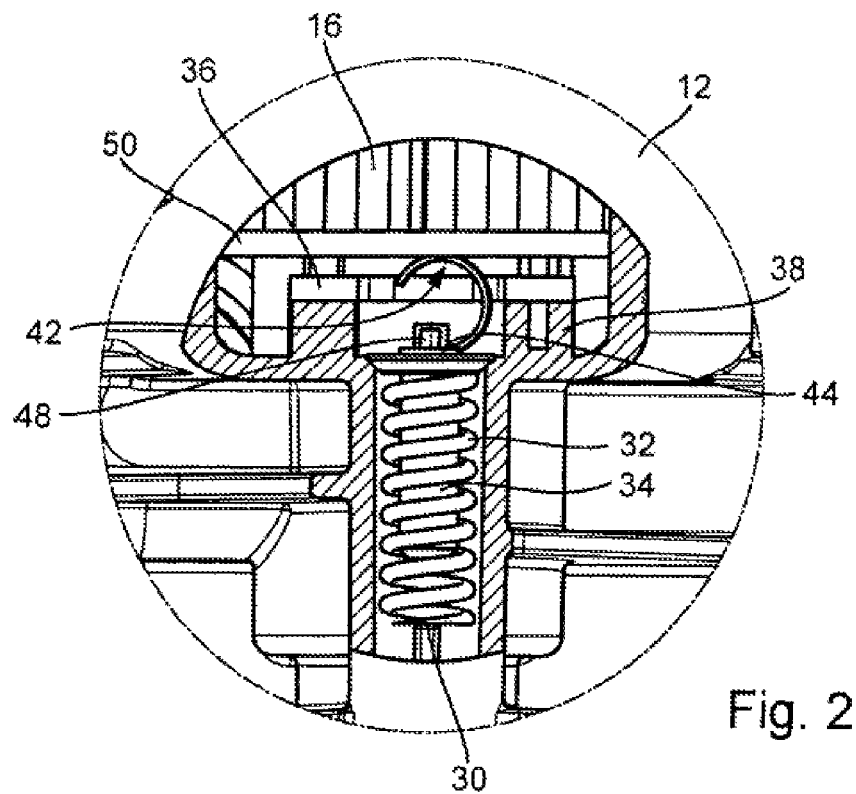
FIG. 2 shows an enlarged partial view of the oil filter arrangement according to FIG. 1, which is rotated by 90° in comparison to FIG. 1.

The oil filter arrangement 10 illustrated in the drawings comprises a housing 12 that has a receiving space 14 for a filter element 16. FIGS. 1 and 2 show the filter element 16 inserted into the housing 12 or its receiving space 14, respectively. The filter element 16 is not available in the receiving space in FIG. 3.

The oil to be filtered flows through the filter element 16 radially from the outside to the inside. The clean oil that is collecting inside the filter element 16 is discharged over a clean oil channel 52. The receiving space 14 is closed with a cover 54 that can also serve to secure the filter element 16 in its intended installation position.

The bottom of the receiving space 14 has a discharge opening 18 for a discharge channel 20. The discharge opening 18 comprises a discharge valve 22. The discharge valve 22 comprises a valve body 24 which acts upon valve seat 26 that surrounds the discharge opening 18 for the purpose of closing said discharge opening. Between the bottom 28 of valve body 24, which is facing away from the receiving space 14, and the flanges 30 that protrude to the interior and which are provided in the discharge channel 20, a coil spring 32 is installed that in its open position acts upon the valve body 24 in an axially upward direction. The valve body 24 comprises a valve rod 34, which engages the coil spring 32 for axial guidance of the valve body 24.

Figure 4:
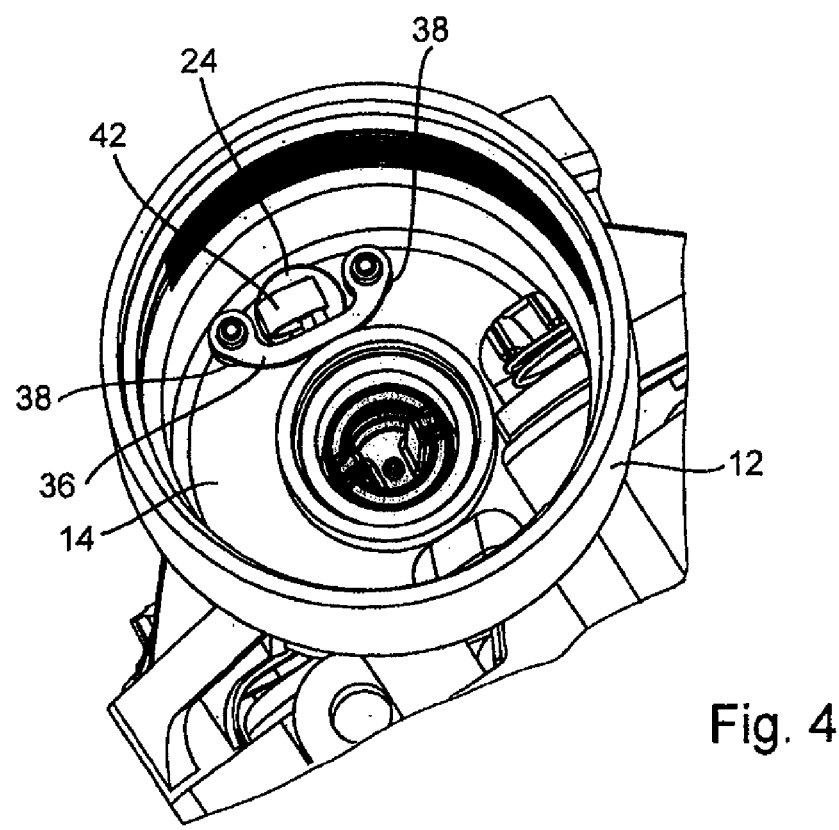
FIG. 4 shows a top view onto the bottom of the receiving space without an inserted filter element.

A retention stop 36 installed in the housing is provided to limit the upward axial movement of the valve body 24. The retention stop 36 is thus designed as a retention plate that is attached to studs 38, said studs 38 being provided at the bottom of the receiving space 14 and extending axially upward and attached by means of hot rivets. As illustrated in particular in FIGS. 2 and 4, the retention stop 36 is arched and sectionally surrounding the central longitudinal axis of the valve body 24.

Figure 3:
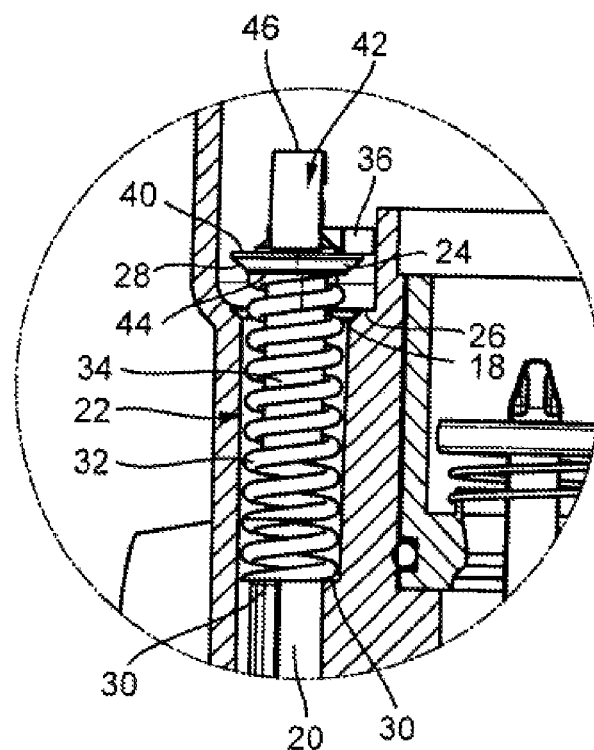
FIG. 3 shows the discharge valve, which is shown in FIGS. 1 and 2, in an open position.

As illustrated in particular in FIGS. 2 and 3, a compound spring 42 is provided on the top 40 of the valve body 24 that is facing away from the discharge channel 20. The compound spring 42 comprises an attachment section 44 and a flat metal band 46, which is bent into an arc shape. The attachment section 44 is fastened to the valve body 24 by means of an attachment pin 48. As illustrated in FIG. 2, the metal band 46 is bent to an arc of almost 270° and the cross section thereof rests approximately upon a circular section.

As illustrated in FIGS. 1 and 2, the valve body 24 is moved by means of the compound spring 42 by the filter element 16 and/or its bottom end disk 50 against the valve seat 26, which keeps the discharge valve 22 in its closed position. Axial tolerances of the filter element 16 and/or the filter housing 18, which can also be the result of different inserting depths of the filter element 16 into the receiving space 14, are sufficiently compensated by means of the compound spring 42.

The spring force of compound spring 42 is greater than the spring force of coil spring 32. This ensures that when the filter element 16 is inserted, the discharge valve 22 remains in its closed position. If the filter element 16 is removed the discharge valve 22 opens because of the spring force of the coil spring 32.

It should be noted that the disclosure is not limited to the embodiment described and illustrated as examples. A large variety of modifications have been described and more are part of the knowledge of the person skilled in the art. These and further modifications as well as any replacement by technical equivalents may be added to the description and figures, without leaving the scope of the protection of the disclosure and of the present patent.

What is claimed is:

1. An oil filter arrangement having a housing, the housing comprising a receiving space for a filter element, which can be inserted into the housing and through which oil can flow, wherein a discharge opening is provided at the bottom of the receiving space, and a discharge valve is provided in the discharge opening, wherein the discharge valve comprises a valve body, which is movable between a locking position and an opening position in a displaceable manner and is moved to the locking position by a first spring element when the filter element is inserted, and which is moved to the opening position by a second spring element that is designed so as to be weaker than the first spring element, characterized in that the first spring element is arranged on the valve body on the side of the valve body facing away from the discharge opening and is configured as a compound spring having a flat, bent metal band, wherein the bent metal band is formed as an open arc shaped curve and in its neutral state is bent over at an angle of from about 180° to about 315°, and wherein the metal band acts against the filter element or against an end disk of the filter element when the filter element is inserted.

2. An oil filter arrangement having a housing, the housing comprising a receiving space for a filter element, which can be inserted into the housing and through which oil can flow, wherein a discharge opening is provided at the bottom of the receiving space, and a discharge valve is provided in the discharge opening, wherein the discharge valve comprises a valve body, which is movable between a locking position and an opening position in a displaceable manner and is moved to the locking position by a first spring element when the filter element is inserted, and which is moved to the opening position by a second spring element that is designed so as to be weaker than the first spring element, characterized in that the first spring element is arranged on the valve body on the side of the valve body facing away from the discharge opening and is configured as a compound spring having a flat, bent metal band, wherein the flat, bent metal band is an open arc shaped curved spring attached at a first end to the valve body, wherein the metal band acts against the filter element or against an end disk of the filter element when the filter element is inserted.

3. The arrangement according to claim 1, characterized in that the metal band in its neutral state is bent over at an angular range of approximately 270°.

4. The arrangement according to claim 1, characterized in that the metal band in its neutral state rests at least generally on a circular section.

5. The arrangement according to claim 1, characterized in that at least one additional metal band is provided which is arranged parallel to the first metal band.

6. The arrangement according to claim 1, characterized in that the valve body is made from plastic material and that the compound spring is made from a metallic material.

7. The arrangement according to claim 1, characterized in that the axial movement of the valve body in the direction of the opening is at least limited by at least one retention stop installed in the housing.

8. The arrangement according to claim 7, characterized in that the retention stop is positioned on at least one stud extending axially upward, said stud being provided at the bottom of the receiving space.

9. The arrangement according to claim 1, characterized in that the discharge opening is connected to a discharge channel and that the second spring element is designed as a coil spring, which on one side acts upon the bottom of the valve body that is facing the discharge channel and on the other side acts upon at least one flange that protrudes radially to the inside in the discharge channel.

10. The arrangement according to claim 1, characterized in that the valve body comprises a valve rod which protrudes into the discharge opening for the axial guidance of the valve body.

* * * * *